Dec. 28, 1926.

D. P. OWENS

ROTARY ENGINE

Filed Jan. 28, 1924

Dabney P. Owens
INVENTOR

BY Victor J. Evans
ATTORNEY

WITNESS: J. L. Wright

Dec. 28, 1926.

D. P. OWENS

ROTARY ENGINE

Filed Jan. 28, 1924

Dabney P. Owens
INVENTOR

BY Victor J. Evans
ATTORNEY

WITNESS: J. T. L. Wright

Dec. 28, 1926.
D. P. OWENS
1,612,046
ROTARY ENGINE
Filed Jan. 28, 1924     3 Sheets-Sheet 3
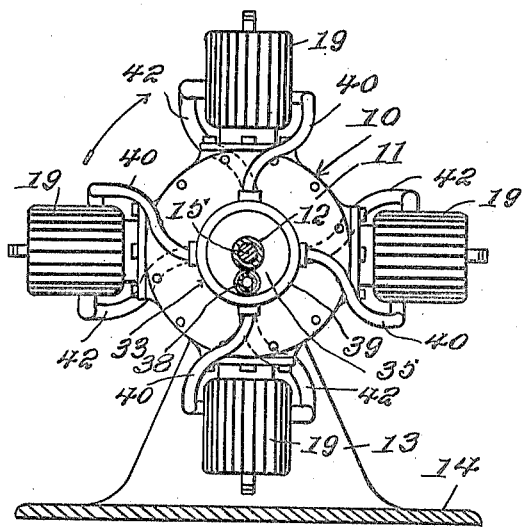
Fig. 3.
Fig. 4.
Fig. 5.
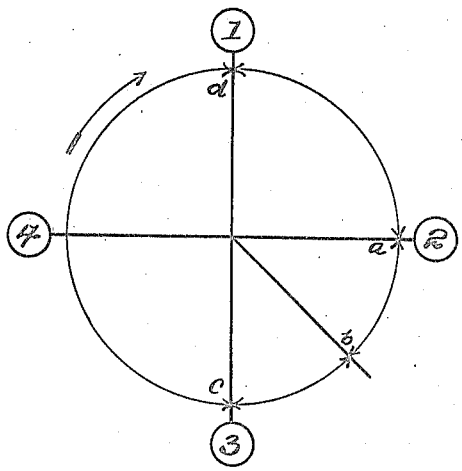
Fig. 6.
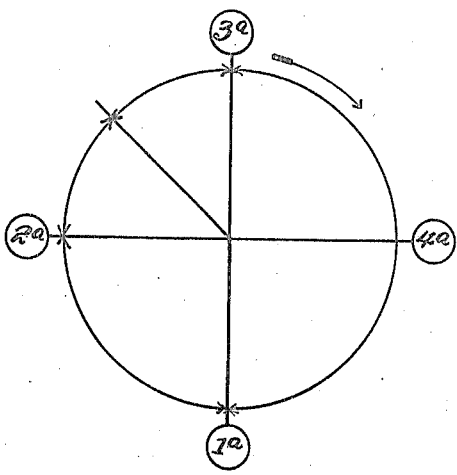
Fig. 7.
Dabney P. Owens
INVENTOR
BY Victor J. Evans
ATTORNEY
WITNESS: J. L. Wright Patented Dec. 28, 1926.

1,612,046

UNITED STATES PATENT OFFICE.

DABNEY P. OWENS, OF LAKE WORTH, FLORIDA.

ROTARY ENGINE.

Application filed January 28, 1924. Serial No. 689,100.

This invention relates to improvements in internal combustion engines of the rotary type and has for an object the provision of an engine having novel means acted upon by the movement of the pistons for imparting rotary movement to the engine cylinders.

Another object of the invention is the provision of a novel arrangement and construction of valves for controlling the intake and exhaust ports of the engine.

Another object is the provision of a novel engine structure which includes the engine housing and position and arrangement of the cylinders carried thereby.

With the above and other objects in view, the invention further includes the following novel features and details of construction, to be hereinafter more fully described, illustrated in the accompanying drawings and pointed out in the appended claims.

In the drawings:—

Figure 3 is an elevation of the engine.

Figure 4 is a sectional view of the exhaust valve.

Figure 5 is a similar view of the intake valve.

Figure 6 is a diagram illustrating the cycle of operation of one set of cylinders.

Figure 7 is a similar view showing the cycle of operation of one of the cylinders of the other set.

Figure 1:
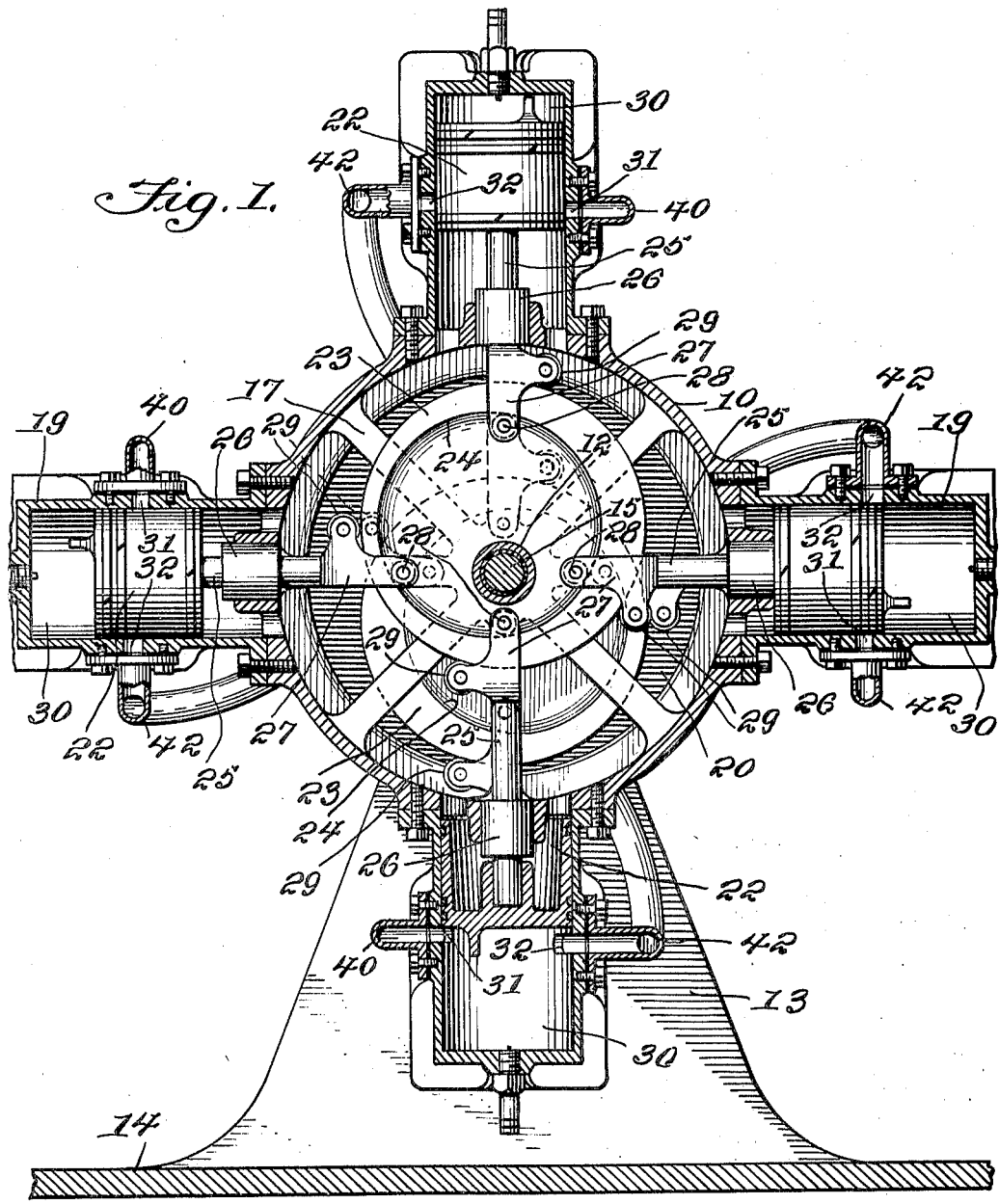
Figure 1 is a vertical sectional view of the engine taken transversely of the drive shaft.

Referring to the drawings in detail wherein like characters of reference denote corresponding parts, the improved engine comprises a housing 10 which is shown as of cylindrical formation with its opposite ends closed by heads 11. This housing is supported upon a stationary bearing sleeve 12 and the latter is in turn mounted in standards 13 which rise from a base 14. Mounted for rotation within the sleeve 12 is a drive shaft 15, spaced bearings 16 being provided in the sleeve so as to reduce friction. The sleeve 12 is interrupted and the housing 10 is divided by a partition 17 through which the shaft 15 passes, the said shaft being keyed to the partition as indicated at 18 so that rotation of the housing will also rotate the shaft.

Figure 2:
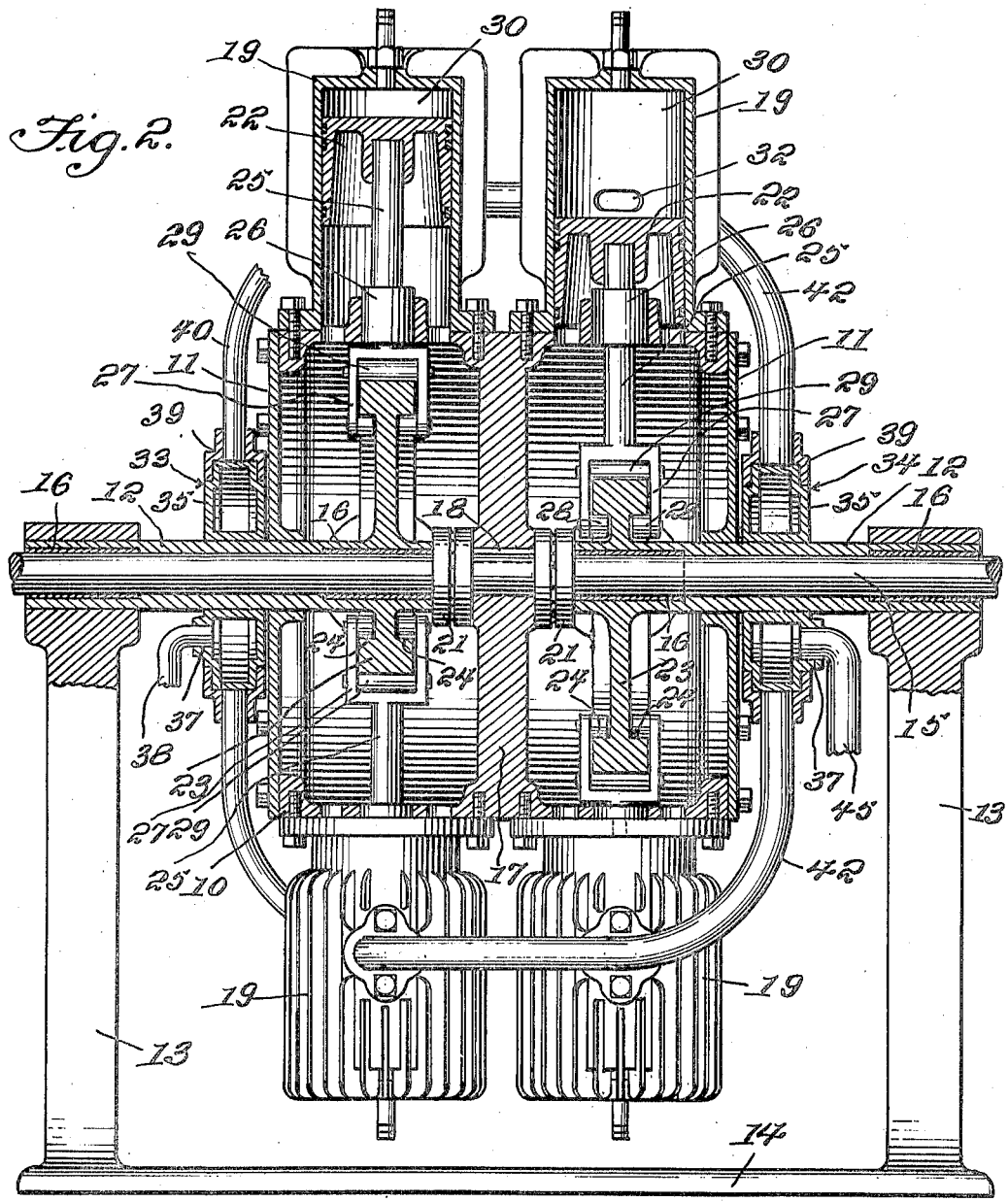
Figure 2 is a similar view taken axially of the drive shaft.

In Figure 2 of the drawings there is illustrated a set of cylinders upon each side of the partition 17 and while four cylinders are shown for each set, this number may be varied as desired. The cylinders which are indicated at 19 are secured to the housing upon opposite sides of the partition 17 so that separate chambers 20 are provided for each set of cylinders. The number of cylinder sets may increase or decrease by increasing or reducing the length of the housing 10. Thrust bearings 21 are provided upon opposite sides of the partition 17.

The cylinders 19 are arranged radially of the shaft 15 and operating within each of the cylinders is a piston 22. Located within each chamber 20 and secured to the sleeve 12 is a stationary cam 23 which is arranged eccentrically with respect to the shaft 15. This cam is circular and is provided with a concentrically arranged annular shoulder 24 upon opposite sides thereof.

Extending inwardly from each of the pistons 22 is a piston rod 25 which is guided in a bearing 26 and which is bifurcated at its inner end to provide a yoke 27. The arms of this yoke are provided with inwardly extending anti-friction rollers 28 which engage and ride upon the annular shoulders 24 of the cam 23. The piston rods 25 are further provided with laterally offset rollers 29 which engage the outer periphery of the cam at one side of the axial center of the cylinders and at one side of the diametrical center of the shaft 15. Thus, when an explosion occurs within the explosion chamber 30 of one of the cylinders, its piston 22 will be forced inward and due to the position of the roller 29 and its point of engagement with the cam 23, a rotary movement will be imparted to the housing 10.

The cylinders are provided with intake ports 31 and exhaust ports 32, the former being controlled by an intake valve 33 which is common to all of the intake ports and an exhaust valve 34 which is common to all of the exhaust ports. The valves 33 and 34 are similar in construction and each includes a stationary chamber 35 having spaced outlet ports 36 and an inlet port 37. The port 37 may be in communication with the source of fuel supply by means of a pipe 38. Surrounding the chamber 35 is a channeled member 39 which is rotatable to cover and uncover the ports, the said member 39 of the valve 33 having secured thereto the inner ends of distributor pipes 40 which communicate with intake ports 31 of the cylinders 19, while the channeled member 39 of the exhaust valve has secured thereto pipes 42 which communicate with the exhaust ports 32 of the cylinders. The valve 34 is provided with an outlet port 44 which is in communication with one end of an exhaust pipe 45.

The chambers 35 of the valves 33 and 34 being stationary, as the casing 10 rotates, the channeled members 39 of the valves will likewise rotate so as to bring the inner ends of the pipes 40 and 42 in communication with the said chambers 35 through the ports 36. As the engine is of the two cycle type, one set of cylinders which is designated in the diagram Figure 6 as 1, 2, 3 and 4, will operate as follows. Moving in the direction of the arrow, the firing operation will occur as cylinder #1 makes its first quarter revolution. Exhaust action will occur as the cylinder passes from the point $a$ to the point $b$ or during one-eighth revolution, while a fresh charge of fuel will be taken in from the point $b$ to the point $c$ and compression of the charge will occur from the point $c$ to the point $d$.

By reference to Figure 7 it will be seen that the firing order of the other set of cylinders designated at $1^a$, $2^a$, $3^a$ and $4^a$ is reversed, firing occurring during the first quarter revolution or from the position of cylinder $1^a$ to the position of cylinder $2^a$, exhaust occurring during the next one-eighth revolution, intake of fresh fuel during next one-eighth revolution and compression of the charge during the next half revolution. The chambers 20 are designed to contain lubricating oil which will pass into and out of the inner ends of the cylinders during their revolution and will supply sufficient lubricant for the proper operation of the pistons and the proper operation of the bearings and the cams and yokes.

Figure 8:
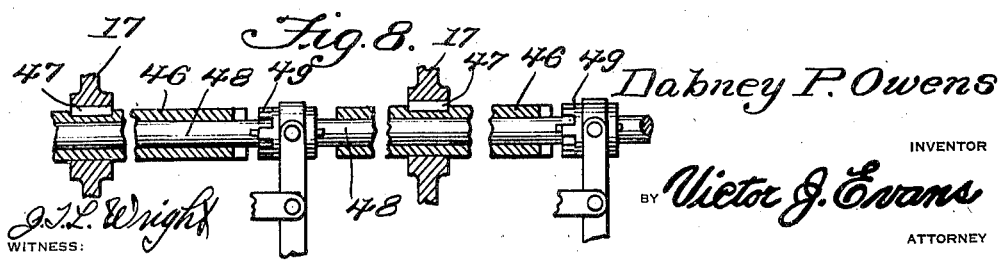
Figure 8 is a fragmentary sectional view illustrating means for selectively coupling one or more sets of cylinders to the drive shaft.

In Figure 8 the casings or housings of each set of cylinders are separate and each casing is keyed to a sleeve 46, as indicated at 47 and these sleeves are formed upon a shaft 48 which constitutes the drive shaft. The sleeves 46 may be locked to the shaft 48 through the medium of clutches 49, so that any number of sets of cylinders may be provided and may be selectively locked to the shaft 48 in accordance with the amount of power desired.

The invention is susceptible of various changes in its form, proportions and minor details of construction and the right is herein reserved to make such changes as properly fall within the scope of the appended claims.

Having described the invention what is claimed is:—

1. An internal combustion engine including a fixed sleeve, a housing revolvable on the sleeve, a cam wheel in the housing and fixed on the sleeve, a shaft for the housing journaled in the sleeve, a plurality of cylinders radiating from the housing, a piston in each cylinder, a rod for each piston, a guide on the housing for each rod, a yoke on the outer end of each rod straddling the cam wheel, rollers journaled on the yoke contacting the inner and outer peripheries of the cam wheel, means for admitting an explosive fluid into the cylinders, and means for exhausting the exploded gases.

2. An internal combustion engine including fixed parallel bearing sleeves, a housing journaled thereon and having a central partition therein, a shaft journaled in the sleeve and to which the partition is fixed, thrust bearings between the partitions and the confronting ends of the sleeves, a cam wheel having a peripheral rim fixed on each sleeve and received in the respective compartments of the housing, spaced cylinders radiating from the housing, a piston in each cylinder, a piston rod for each piston, a guide on the periphery of the housing for each rod, a yoke on the inner end of each rod, anti-frictional rollers carried by the yokes for contacting the inner and outer peripheries of the respective cam wheels, a hollow cylindrical member having peripheral ports fixed on the sleeves at the opposite side of the housing and providing respectively fluid intake and fluid exhaust members, a flanged ring surrounding and revolvable on each of said members, said cylinders having intake and exhaust ports, and pipe members on the said flanged rings communicating with the ports of the cylinders.

In testimony whereof I affix my signature.

DABNEY P. OWENS.